US011178810B2

(12) United States Patent
Tutt, Jr.

(10) Patent No.: US 11,178,810 B2
(45) Date of Patent: Nov. 23, 2021

(54) STEP AND RAIL SYSTEM TO AID DISABLED OPERATORS OF RIDING MOWERS

(71) Applicant: Cleo Preston Tutt, Jr., Harlem, GA (US)

(72) Inventor: Cleo Preston Tutt, Jr., Harlem, GA (US)

( * ) Notice: Subject to any disclaimer, the term of this patent is extended or adjusted under 35 U.S.C. 154(b) by 154 days.

(21) Appl. No.: 16/566,247

(22) Filed: Sep. 10, 2019

(65) Prior Publication Data

US 2020/0077579 A1 Mar. 12, 2020

Related U.S. Application Data

(60) Provisional application No. 62/728,961, filed on Sep. 10, 2018.

(51) Int. Cl.
*A01D 34/00* (2006.01)
*A01D 101/00* (2006.01)
*A01D 34/64* (2006.01)

(52) U.S. Cl.
CPC ............ *A01D 34/001* (2013.01); *A01D 34/64* (2013.01); *A01D 2101/00* (2013.01)

(58) Field of Classification Search
CPC .... A01D 34/001; A01D 34/64; A01D 34/828; A01D 34/824; A01D 2101/00; A01D 67/00; Y10T 16/476; Y10T 16/499; Y10T 16/44; B60R 3/005; B60R 3/00; B60R 21/02; B60R 21/028; B60R 2021/0213; B60R 21/13
See application file for complete search history.

(56) References Cited

U.S. PATENT DOCUMENTS

| 3,244,433 | A | | 4/1966 | Grigsby et al. |
| 3,673,775 | A | * | 7/1972 | Jones .................... A01D 67/00 56/14.7 |
| 5,765,347 | A | | 6/1998 | Wright et al. |
| 5,791,634 | A | * | 8/1998 | Brown ................... B60R 3/005 256/1 |

(Continued)

OTHER PUBLICATIONS

Challenger commercial grade zero-turn mower Internet page, dated Jun. 10, 2015, retrieved from Internet Wayback Machine on Apr. 8, 2021; http://www.countryclipper.com:80/store/c1/mowers/p5/challenger/ (Year: 2015).*

(Continued)

*Primary Examiner* — Steve Clemmons
(74) *Attorney, Agent, or Firm* — Dunlap Bennett & Ludwig, PLLC

(57) ABSTRACT

A step and rail system adapted for riding mower so that a physically challenged operator can assist themselves in mounting the seat is provided. The step and rail system provides a horizontal support rail configuration of two spaced apart rails. The present invention includes a front mounting plate for an intermediate step and two rear mounting plates for supporting the two spaced apart rails that extend from the rear of the riding mower to the front mounting plate. The horizontal support rail configuration may provide a compound bend fore the seat so that the horizontal support rail configuration is wider adjacent the seat as compared to the mower stepping surface.

8 Claims, 3 Drawing Sheets

(56) References Cited

U.S. PATENT DOCUMENTS

| | | | |
|---|---|---|---|
| 7,156,443 B1 | 1/2007 | Jung | |
| 7,641,234 B1* | 1/2010 | Pelnar | B60R 21/13 |
| | | | 280/756 |
| 8,006,796 B1 | 8/2011 | Fontaine | |
| 8,083,020 B2 | 12/2011 | Corriher | |
| 8,794,660 B1* | 8/2014 | Stover | H05K 999/99 |
| | | | 280/727 |
| 8,985,660 B1* | 3/2015 | Weber | B60R 3/005 |
| | | | 296/1.02 |
| 9,696,749 B2 | 7/2017 | Kaskawitz et al. | |
| D869,513 S * | 12/2019 | Cordes | D15/17 |
| 10,517,213 B2* | 12/2019 | Lundgren | B60N 3/02 |
| 2002/0162314 A1 | 11/2002 | Velke et al. | |
| 2003/0020253 A1* | 1/2003 | Bosman | B60R 3/005 |
| | | | 280/164.1 |
| 2005/0183409 A1* | 8/2005 | Barrier | A01D 34/824 |
| | | | 56/11.9 |
| 2007/0137918 A1 | 6/2007 | Dong et al. | |
| 2007/0290493 A1* | 12/2007 | David | B60R 21/13 |
| | | | 280/756 |
| 2008/0236125 A1 | 10/2008 | Sugio et al. | |
| 2009/0308039 A1 | 12/2009 | Marshall et al. | |
| 2009/0322052 A1* | 12/2009 | Ruehl | B60R 3/00 |
| | | | 280/166 |
| 2010/0244477 A1 | 9/2010 | Jagasia et al. | |
| 2016/0037717 A1* | 2/2016 | Giere | A01D 34/64 |
| | | | 56/320.1 |
| 2016/0106030 A1 | 4/2016 | Lundgren et al. | |
| 2016/0318433 A1 | 11/2016 | Baron | |
| 2017/0130425 A1* | 5/2017 | Kim | E02F 9/24 |
| 2017/0238468 A1 | 8/2017 | Lundgren et al. | |

OTHER PUBLICATIONS

Sikkem, Paul; "Riding Mowers, Lawn Tractors and Zero Turn Mowers for People with Disabilities," Mar. 2, 2017; Todays Mower. com; https://todaysmower.com/riding-mowers-lawn-tractors-and-zero-turn-mowers-for-people-with-disabilities/; retrieved Apr. 8, 2021 (Year: 2017).*

* cited by examiner

STEP AND RAIL SYSTEM TO AID DISABLED OPERATORS OF RIDING MOWERS

CROSS-REFERENCE TO RELATED APPLICATION

This application claims the benefit of priority of U.S. provisional application No. 62/728,961, filed 10 Sep. 2018 the contents of which are herein incorporated by reference.

BACKGROUND OF THE INVENTION

The present invention relates to accessories for riding mowers and, more particularly, to a step and rail system for aiding physically challenged operators seating themselves on a riding mower.

Riding mowers, ride-on mowers, or tractor mowers are lawn mowers where the operator is seated. Typical a mower stepping surface is provided for the would-be operator to step from the ground to the seat. People with certain physical disabilities or in a weakened state from age and/or illness, however, are sometimes not able to make it to the mower stepping surface and/or otherwise seat themselves on a riding mower, and thus, by definition, cannot operate it.

As can be seen, there is a need for a step and rail system to aid physically challenged individuals to seat themselves on a riding mower. The step and rail system embodied in the present invention provides a novel arrangement of steps and handrails that are mounted to the riding mower, aiding the operator to mount and dismount the seat of the riding mower. The novel arrangement includes two spaced apart horizontal rails running a substantial length of the riding mower, and wherein the horizontal rails provide a compound bend for widening immediately adjacent the seat relative to the mower stepping surface.

SUMMARY OF THE INVENTION

In one aspect of the present invention, a step and rail system for a riding mower includes the following: an intermediate step mounted to a front portion of the riding mower, the step disposed at a step elevation between an elevation of a support surface for the riding mower and an elevation of a mower stepping surface of the riding mower; two spaced apart rails extending from a rear portion of the riding mower to a front portion of the riding mower adjacent the intermediate step; and the two spaced apart rails are spaced apart a distance greater than a width of a centrally disposed seat of the riding mower.

In another aspect of the present invention, the step and rail system for a riding mower includes the following: a front mounting plate mounted to a front portion of the riding mower, wherein the intermediate seat is attached to the mounting plate; a step plate attached to the front mounting plate; an intermediate step mounted to said step plate so that the intermediate step is disposed at a step elevation between an elevation of a support surface for the riding mower and an elevation of a mower stepping surface of the riding mower; two spaced apart rails extending from a rear portion of the riding mower to a front portion of the riding mower adjacent the intermediate step; the two spaced apart rails are spaced apart a distance greater than a width of a centrally disposed seat of the riding mower; a crossbar interconnecting the two spaced apart rails aft said seat; a left mounting plate and a right mounting plate attached to said rear portion so as to be rear attachment points for the two spaced apart rails, respectively; a mower stepping surface adjacent the front portion of the riding mower; and the two spaced apart rails are spaced further apart immediate adjacent said seat relative to adjacent said mower stepping surface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a step and rail system adapted to frame a seat of a riding mower so that a physically challenged operator can assist themselves in mounting the seat. The step and rail system provides a horizontal support rail configuration of two spaced apart rails. The present invention includes a front mounting plate for an intermediate step and two rear mounting plates for supporting the two spaced apart rails as the extend from the rear of the riding mower to the front thereof. The horizontal support rail configuration may provide a compound bend fore the seat so that the horizontal support rail configuration is wider adjacent the seat as compared to the mower stepping surface. The narrower rail configuration immediately adjacent the stepping surface assists the physically challenged operator from the ground up to the mower stepping surface.

Figure 1:
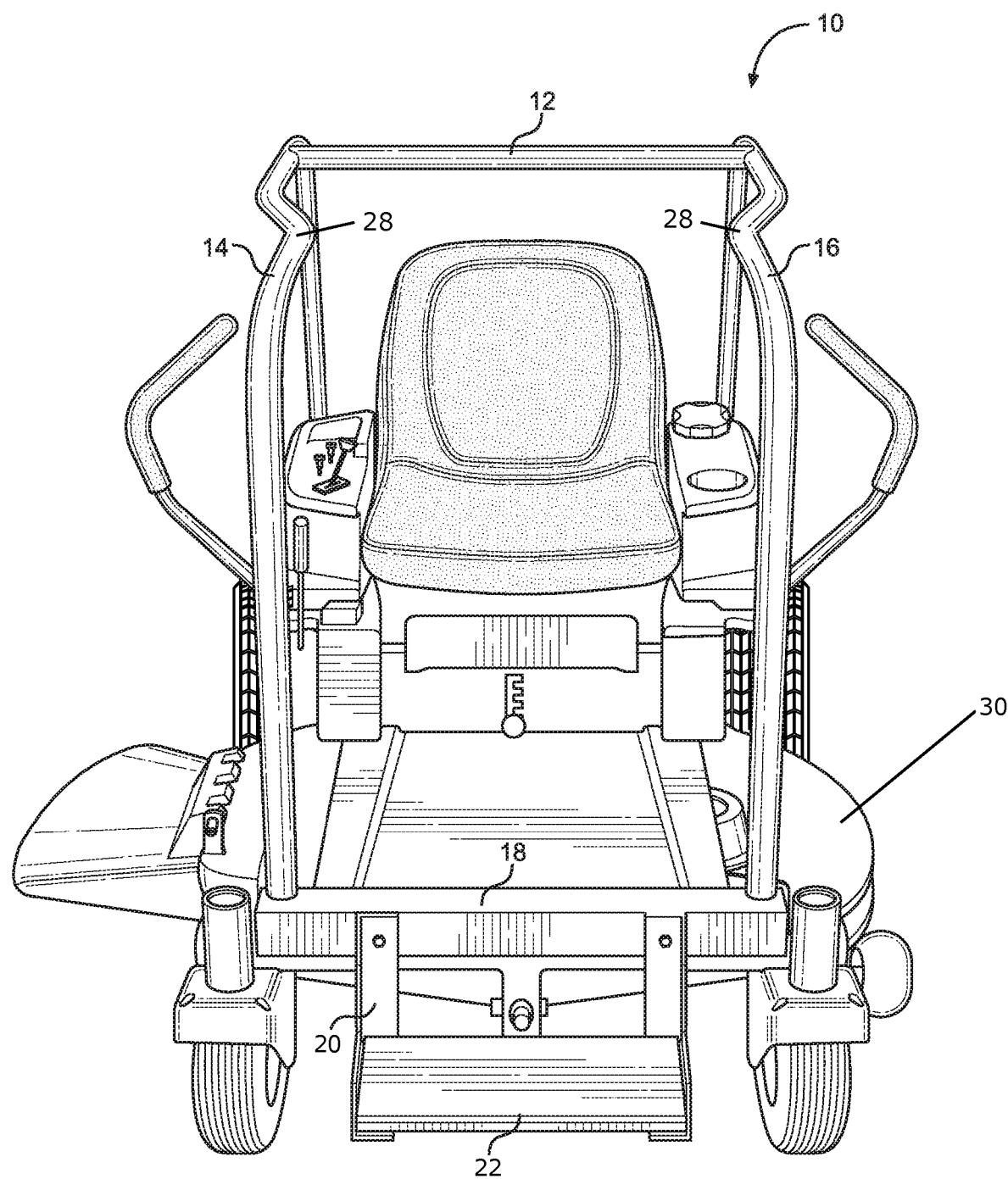
FIG. 1 is a front perspective view of an exemplary embodiment of the present invention.
Figure 2:
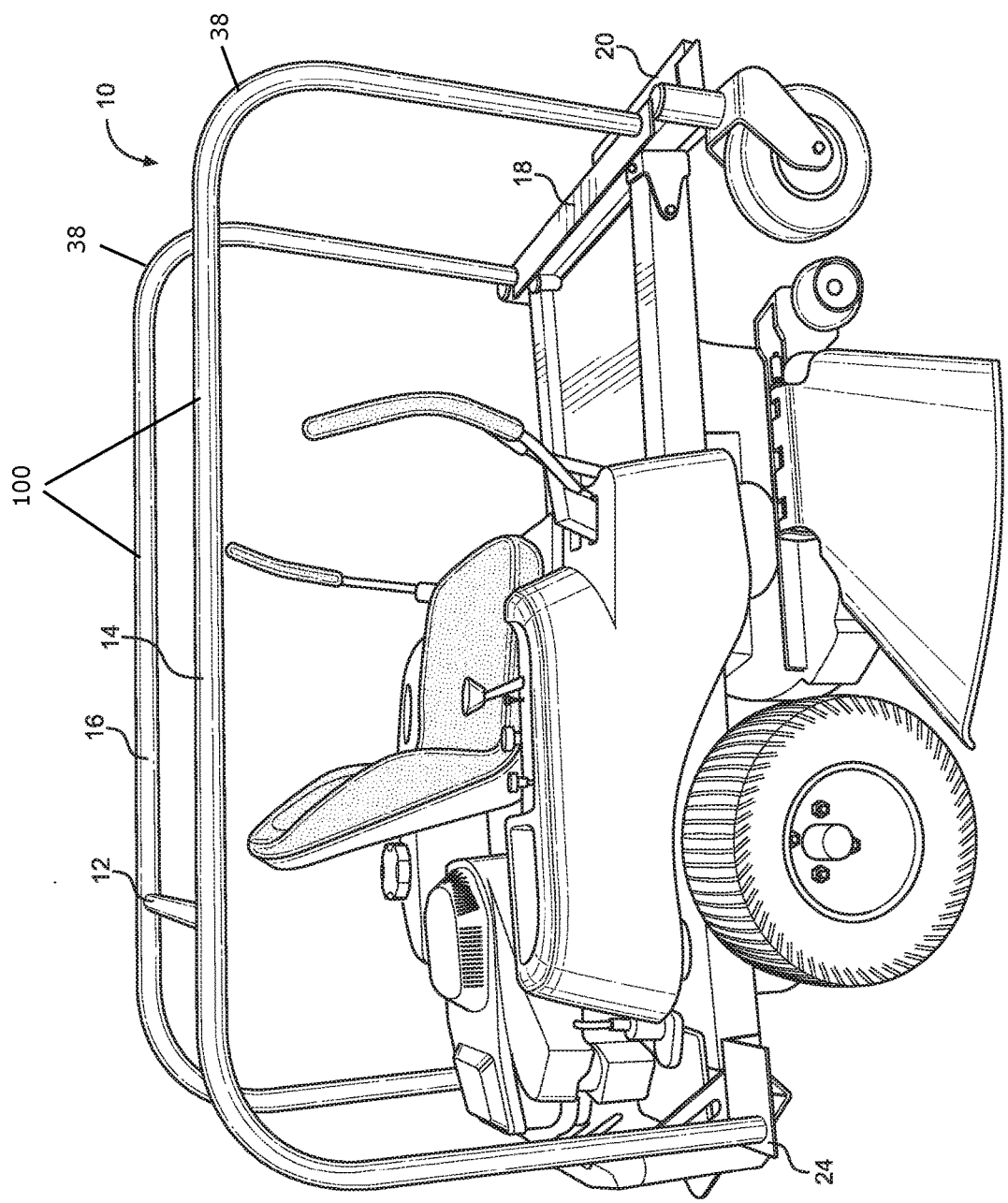
FIG. 2 is a left perspective view of an exemplary embodiment of the present invention.
Figure 3:
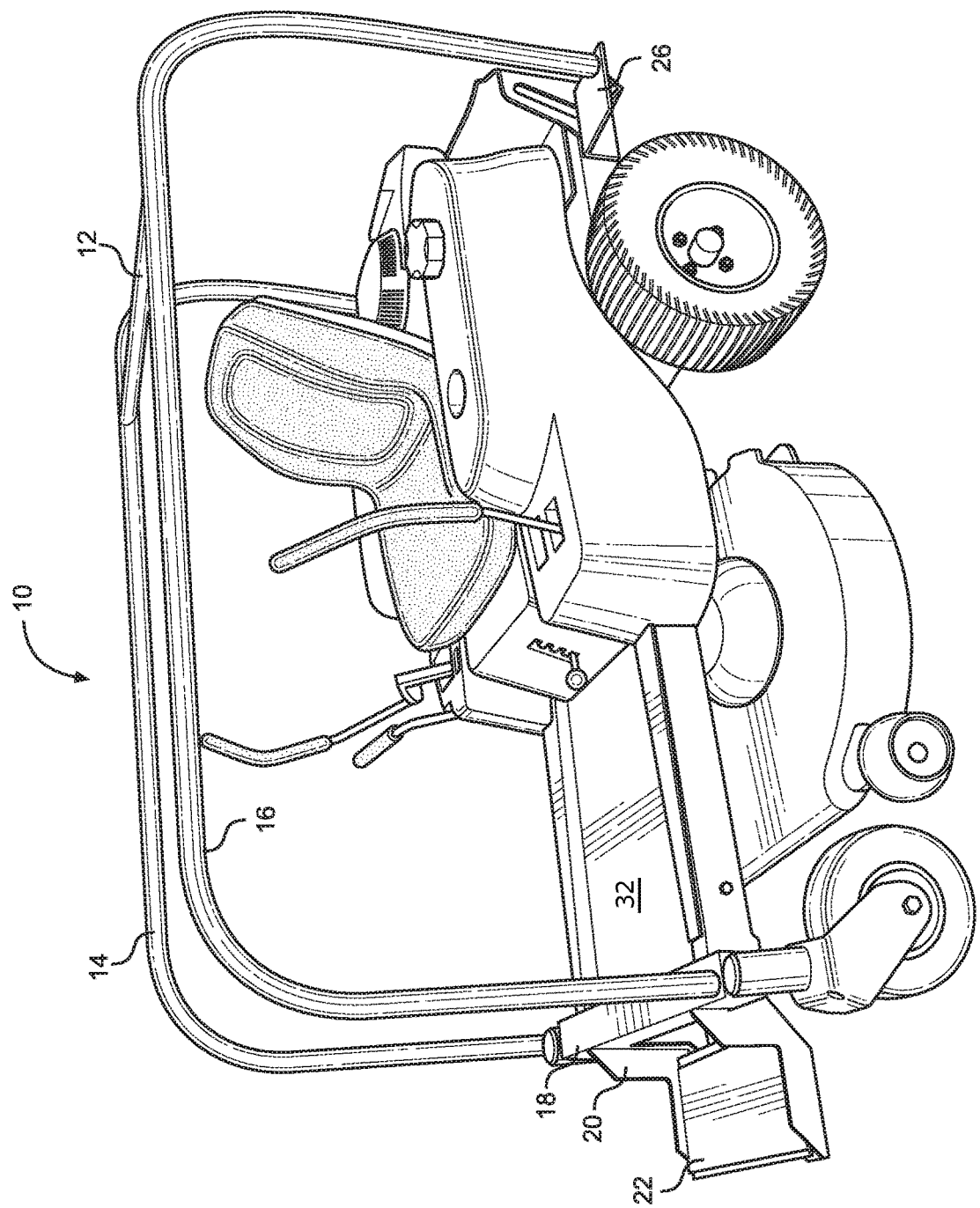
FIG. 3 is a right perspective view of an exemplary embodiment of the present invention.

Referring to FIGS. 1 through 3, the present invention may include a step and rail system 10 for aiding physically challenged operators to sit on the seat of a riding mower. The step and rail system 10 may include a front mounting bracket 18, a step mounting bracket 20, and a step 22 for providing the step component, and a left rail 16, a right rail 14, a crossbar 12, and a right and left rear mounting bracket 24 and 26, respectively, for providing the rail component.

The front mounting bracket 18 operatively associates with a front portion of the riding mower 30 through conventional fasteners or the like. The front mounting bracket 18 provides a surface to attach the centrally-disposed step mounting bracket 20 and the front distal ends of the left and right rails 16 and 14 near the ends of the front mounting bracket. The front mounting bracket 18 may be an L-bracket or the like.

It should be understood by those skilled in the art that the use of directional terms such as horizontal, vertical, upper, lower, upward, downwardly, top, right, left and the like are used in relation to the illustrative embodiments as they are depicted in the figures, the upward direction (or upper) being toward the top of the corresponding figures, the downward (or lower) direction being toward the bottom of the corresponding figures, left and right correspond with the would-be operator sitting in the seat of the riding mower 30 shown in the corresponding figures, and horizontal is defined relative to the unshown supporting surface of the riding mower 30 in the corresponding figures.

The step brackets mounting bracket(s) 20 are attached to the front mounting bracket 18 and provide the support for the horizontal step 22. The step 22 may be positioned half the distance between the supporting surface/ground and the mower stepping surface 32 of the front of the riding mower 30, which is dimensioned for the non-physically challenged user of the riding mower 30 and the ground. The step 22 gives a person with limited range or in a weakened state the ability to overcome the height of the mower stepping surface 32 with an intermediate step 22.

The left and right rear mounting brackets 26 and 24 provide rear attachment points for the distal ends of the left and right rails 16 and 14, respectively. The rear mounting brackets 26 and 24 are attached with fasteners or other joining elements (such as welding) to existing holes in or to surfaces of the rear frame of the riding mower 30. The hand rails have two, typically rounded, 90-degree transition bends 38 that allow the rails to attach to and interconnect the front mounting bracket 18 and the rear mounting brackets 26 and 24 to create a spaced-apart horizontal support rail configuration 100. The upper section of the left and right rails 16 and 14 may contain compound bends 28 that moves the rails away from the seat to allow more room for the operator. The space between the two horizontal support rail configuration 100 accommodates the seat of the riding mower 30, and thus aids the operator mounting said riding mower 30. A crossbar 12 may connect the two spaced-apart horizontal support rail configuration 100, adding lateral support by tying the rails together. The crossbar 12 is disposed rearward of the seat.

The front mounting bracket 18 and step mounting brackets 20 may be cut from sufficiently durable material, such as aluminum, with the strength to resist repeated bending stress applied as a result of the use contemplated herein. The front mounting bracket 18 may attach to the front axle. The step 22 may be located between the front wheels but must be narrow enough to allow the front wheels to rotate 360 degrees as designed. The rear mounting brackets 24 and 26 may be made from material with the strength to resist repeated bending stress applied as a result of the use contemplated herein. The rear mounting brackets 24 and 26 may be attached by using existing holes in the mower frame. The handrail attachment points 18, 24, and 26 could be relocated and/or the step 22 can be relocated to accommodate specific user's disabilities and/or weaknesses.

The left and right rails 16 and 14 may be made from 1½-inch aluminum tubing and bent using a tubing bender. Once the distance between the front and rear mounting is determined the tubing may be bent to fit that measurement and welded to the mounting brackets 18, 24, and 26. All components may be TIG welded together. Aluminum may be used due to its strength to weight ratio. All elements are necessary as the parts are connected together to make one functional piece.

A method of using the present invention may include the following. The step and rail system 10 disclosed above may be provided. A would-be operator may grasp either the left and right rails 16 and 14, or both, to assist in stepping onto the step 22, which is approximately half the distance from the ground than the mower stepping surface 32, to step up to said stepping surface 32 so as to seat themselves on the seat, all while having the left and right rails 16 and 14 of the horizontal support rail configuration 100 in reach throughout the lowering and lifting process to and from said seat.

Additionally, the step and rail system 10 could be used to aid in accessing the seats of different types of equipment, for instance, tractors or other heavy-duty riding equipment.

It should be understood, of course, that the foregoing relates to exemplary embodiments of the invention and that modifications may be made without departing from the spirit and scope of the invention as set forth in the following claims.

What is claimed is:

1. A step and rail system for a riding mower, comprising:
   an intermediate step mounted to a front portion of the riding mower, the step disposed at a step elevation between an elevation of a support surface for the riding mower and an elevation of a mower stepping surface of the riding mower;
   two spaced apart rails extending from a rear portion of the riding mower to a front portion of the riding mower adjacent the intermediate step;
   the two spaced apart rails are spaced apart a distance greater than a width of a centrally disposed seat of the riding mower;
   a front mounting plate attached to said front portion;
   the intermediate step attaches to the front mounting plate; and
   the front mounting plate provides front attachment points for the two spaced apart rails, respectively.

2. The step and rail system for a riding mower of claim 1, further comprising:
   a crossbar interconnecting the two spaced apart rails aft said seat.

3. The step and rail system for a riding mower of claim 1, further comprising:
   a front mounting plate mounted to said front portion, wherein the intermediate step is attached to the mounting plate.

4. The step and rail system for a riding mower of claim 3, further comprising:
   a step plate attached to the front mounting plate; and
   an intermediate step mounted to said step plate so that the intermediate step is disposed at the step elevation.

5. The step and rail system for a riding mower of claim 1, further comprising:
   a left mounting plate and a right mounting plate attached to said rear portion so as to be rear attachment points for the two spaced apart rails, respectively.

6. The step and rail system for a riding mower of claim 1, further comprising:
   a compound bend in each of the two spaced apart rails fore said seat so that the two spaced apart rails are spaced further apart immediate adjacent said seat relative to adjacent the front portion of the riding mower.

7. A step and rail system for a riding mower, comprising:
   a front mounting plate mounted to a front portion of the riding mower;
   a step plate attached to the front mounting plate;
   an intermediate step mounted to said step plate so that the intermediate step is disposed at a step elevation between an elevation of a support surface for the riding mower and an elevation of a mower stepping surface of the riding mower;
   two spaced apart rails extending from a rear portion of the riding mower to a front portion of the riding mower adjacent the intermediate step;
   the two spaced apart rails are spaced apart a distance greater than a width of a centrally disposed seat of the riding mower;

a crossbar interconnecting the two spaced apart rails aft said seat; and a left mounting plate and a right mounting plate attached to said rear portion so as to be rear attachment points for the two spaced apart rails, respectively.

8. A method of aiding physically challenged individuals mount a seat of a riding mower having a mower stepping surface adjacent said seat, comprising:

installing the step and rail system for a riding mower of claim 7 using welding to attach said mounting plates to the riding mower.

* * * * *